(12) United States Patent
Murata

(10) Patent No.: US 7,957,235 B2
(45) Date of Patent: Jun. 7, 2011

(54) DISK DRIVE AND INFORMATION PROCESSING SYSTEM HAVING THE SAME

(75) Inventor: Tatsuya Murata, Tokorozawa (JP)

(73) Assignee: TEAC Corporation, Tama-shi, Tokyo (JP)

( * ) Notice: Subject to any disclaimer, the term of this patent is extended or adjusted under 35 U.S.C. 154(b) by 437 days.

(21) Appl. No.: 12/060,038

(22) Filed: Mar. 31, 2008

(65) Prior Publication Data

US 2009/0080302 A1    Mar. 26, 2009

(30) Foreign Application Priority Data

Sep. 21, 2007    (JP) ................. 2007-244735

(51) Int. Cl.
*G11B 20/10* (2006.01)
(52) U.S. Cl. ................. 369/44.33; 369/44.38
(58) Field of Classification Search .......... 369/47.32, 369/47.33, 47.28, 47.38
See application file for complete search history.

(56) References Cited

U.S. PATENT DOCUMENTS

| 5,452,277 | A * | 9/1995 | Bajorek et al. | 369/53.18 |
| 6,711,106 | B2 | 3/2004 | Sasaki | |
| 6,901,039 | B1 * | 5/2005 | Sugie et al. | 369/47.28 |
| 6,914,859 | B2 | 7/2005 | Miyamoto | |
| 7,130,253 | B2 | 10/2006 | Hosono | |
| 2002/0024902 | A1 | 2/2002 | Sasaki | |
| 2002/0024907 | A1 | 2/2002 | Hosono | |
| 2003/0152005 | A1 | 8/2003 | Miyamoto | |
| 2005/0007918 | A1 | 1/2005 | Tokudome | |

FOREIGN PATENT DOCUMENTS

| JP | 2000-132901 A | 5/2000 |
| JP | 2001-307411 A | 11/2001 |
| JP | 2002-8316 A | 1/2002 |
| JP | 2003-242711 A | 8/2003 |
| JP | 2003-281815 A | 10/2003 |
| JP | 2004-362733 A | 12/2004 |
| JP | 2006-147119 A | 6/2006 |
| JP | 2006-331565 A | 12/2006 |
| JP | 2007-48366 A | 2/2007 |
| WO | WO2007148302 A2 * | 12/2007 |

* cited by examiner

*Primary Examiner* — Aristotelis Psitos
(74) *Attorney, Agent, or Firm* — Seed IP Law Group PLLC

(57) ABSTRACT

A disk drive controls the rotational speed of a disk to an appropriate value. A system controller of the drive stores data read from a disk and read-ahead data into buffer memory. A time interval ti at which the buffer memory becomes full is measured, and the time interval ti is compared with a predetermined lower limit value t1 and a predetermined upper limit value t2. When a relationship of ti>t2 stands, rotational speed is increased. When a relationship of ti<t1 stands, control is performed in such a way that the rotational speed is decreased so as to achieve $t1 \leq ti \leq t2$.

20 Claims, 3 Drawing Sheets

DISK DRIVE AND INFORMATION PROCESSING SYSTEM HAVING THE SAME

PRIORITY INFORMATION

This application claims priority to Japanese Patent Application No. 2007-244735 filed on Sep. 21, 2007, which is incorporated herein by reference in its entirety.

BACKGROUND

1. Technical Field

The present invention relates to a disk drive and an information processing system having the disk drive, and more particularly, control of the number of rotations of a disk.

2. Related Art

Techniques for controlling the number of rotations of a disk to an optimum number of rotations have hither to been proposed. For instance, JP 2004-362733 A describes a technique for comparing a cache activity ratio with two threshold values; namely, a high threshold value and a low threshold value, and controlling the number of rotations of a disk in accordance with results of comparison. Further, controlling the number of rotations in accordance with a command interval is also disclosed.

JP 2002-8316 A describes a technique for measuring an average transfer rate of data transferred from cache memory to a host; comparing the thus-measured average transfer rate with a threshold value; and controlling the number of rotations of a disk in accordance with a result of comparison.

JP 2007-48366 A describes a technique for increasing the rotational speed of a motor that rotates a disk when a transfer rate of data to be written/read exceeds a threshold value Rth and when a duration of time, in which the transfer rate exceeds the threshold value Rth, continues a threshold value Tth or more and decreasing the rotational speed of the motor that rotates the disk when a transfer rate of data to be written/read falls below the threshold value Rth and when a duration of time, in which the transfer rate falls below the threshold value Rth, continues the threshold value Tth or more.

JP 2006-147119 A describes a technique for identifying whether current operation is audio playback or ripping (capturing data from a CD or a DVD directly and into a personal computer or converting the data into an image file or another file format and capturing the thus-converted data into the personal computer) in accordance with the configuration of a command pattern issued without measurement of a transfer rate and determining the rotational speed of a disk.

JP 2000-132901 A describes a technique for controlling rotational speed in accordance with a file size. Moreover, JP 2003-242711 A describes a technique for controlling the rotational speed of a disk in accordance with an idle time of a drive (a time elapsing from when execution of a command is completed until when performance of the next command is commenced).

In the meantime, a technique that enables increasing/decreasing control of the number of rotations of a disk in a more simplified manner without measurement of a transfer rate or detection of the configuration of a command pattern has been desired.

SUMMARY

The present invention provides an apparatus capable of readily controlling rotational speed of a disk.

The present invention provides a disk drive comprising:
a reading section for reading data from a disk;
memory for temporarily retaining data read from the disk; and
a control section that controls rotational speed of the disk in accordance with a time interval at which the memory becomes full and that performs control so as to decrease the rotational speed when the time interval is smaller than a set lower limit value and to increase the rotational speed when the time interval is greater than a set upper limit value, thereby controlling the time interval so as to fall between the lower limit value and the upper limit value.

In one embodiment of the present invention, the control section controls an increasing rate employed when the rotational speed is increased so as to become greater than a decreasing rate employed when the rotational speed is decreased.

In another embodiment of the present invention, the control section performs control so as to decrease the rotational speed regardless of the time interval when a command is not received from a host within a given period of time.

The disk drive of the present invention can be built into a host machine, such as a personal computer, or connected to the host machine so as to be able to exchange data, thereby constituting an information processing system.

According to the present invention, rotational speed can be appropriately controlled in an increasing or decreasing manner by use of a time interval at which memory becomes full.

The invention will be more clearly comprehended by reference to the embodiment provided below. However, the embodiment is merely illustrative, and the scope of the invention is not limited to the embodiment.

BRIEF DESCRIPTION OF THE DRAWINGS

A preferred embodiment of the present invention will be described in detail by reference to the following drawings, wherein.

DETAILED DESCRIPTION

An embodiment of the present invention will be described hereunder by reference to the drawings by means of taking an optical disk drive as a disk drive. In addition to acting as a standalone drive, the optical disk drive of the present embodiment can function also as a portion of an information processing system that receives a command from a personal computer and reads data when incorporated into the personal computer, or the like, and that supplies the thus-read data to the personal computer.

Figure 1:
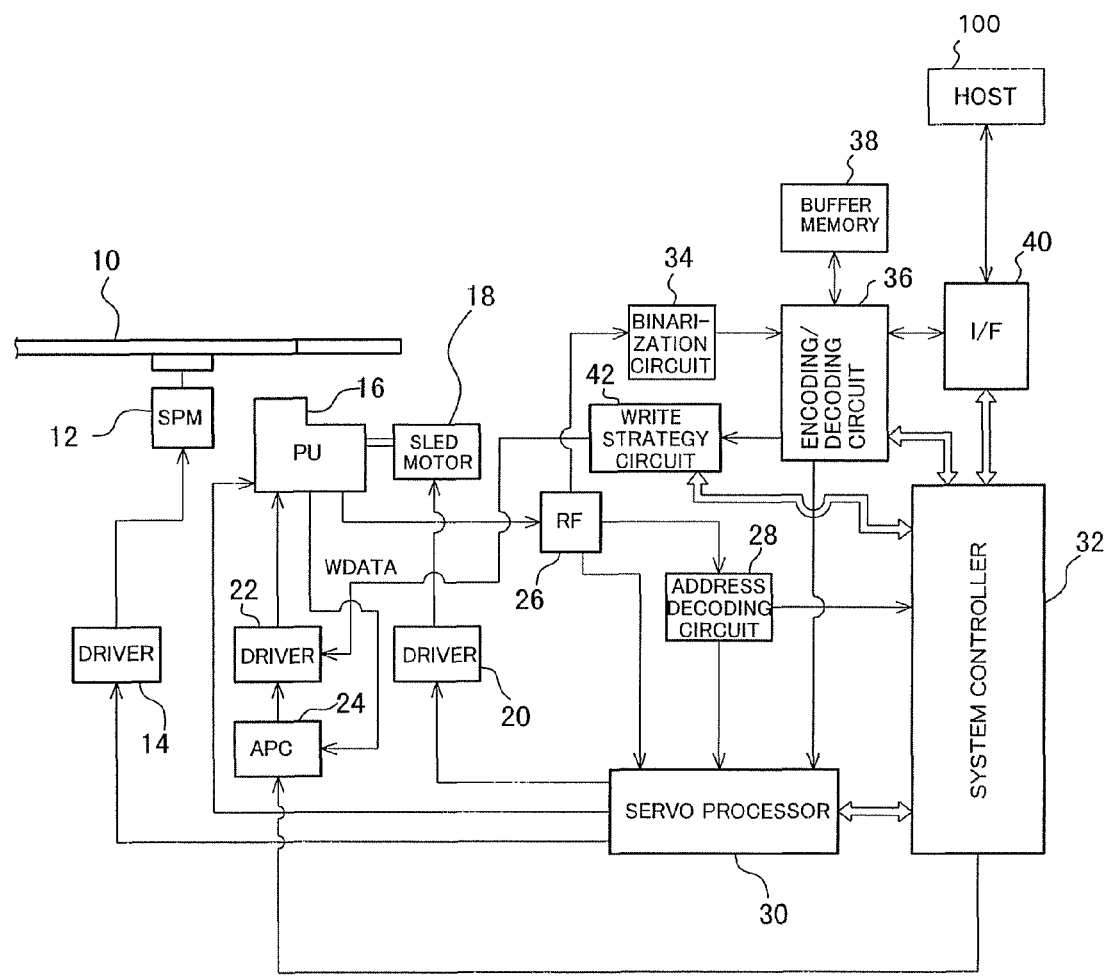
FIG. 1 is an entire block diagram of a disk drive of an embodiment.

FIG. 1 shows the overall configuration of an information processing system including an optical disk drive of the embodiment. An optical disk 10, such as a CD, a DVD, an HD-DVD, and a BD (Blu-ray Disk), is rotationally driven by a spindle motor (SPM) 12. The spindle motor SPM 12 is driven by a driver 14, and the driver 14 is servo-controlled by a servo processor 30 so as to attain a desired rotational speed.

The optical pickup 16 includes a laser diode (LD) for radiating a laser beam onto the optical disk 10 and a photodetector (PD) that receives light reflected from the optical disk 10 and converts the thus-received light into an electric signal; and is disposed opposite the optical disk 10. The optical pickup 16 is driven in a radial direction of the optical disk 10 by means of a sled motor 18, and the sled motor 18 is driven by a driver 20. As is the case with the driver 14, the driver 20 is servo-controlled by the servo processor 30. The LD of the optical pickup 16 is driven by a driver 22, and the driver 22 controls, by an automatic power control circuit (APC) 24, the drive current in such a way that laser power comes to a desired value. The APC 24 and the driver 22 control amounts of light emission of the LD under an instruction from a system controller 32. In the drawing, the driver 22 is provided separately from the optical pickup 16, but the driver 22 may also be incorporated into the optical pickup 16.

A read command is issued by a host 100, such as a personal computer, into which the optical disk drive is to be incorporated. When data recorded in the optical disk 10 are read in response to the read command, a laser beam of reproducing power is emitted from the LD of the optical pickup 16; resultant reflected light is converted into an electric signal by the PD; and the electric signal is output. A reproduced signal from the optical pickup 16 is fed to an RF circuit 26. The RF circuit 26 generates from the reproduced signal a focus error signal and a tracking error signal and feeds the thus-generated signals to the servo processor 30. In accordance with these error signals, the servo processor 30 servo-controls the optical pickup 16, thereby maintaining the optical pickup 16 in on-focus and on-track states. Moreover, the RF circuit 26 feeds an address signal included in the reproduced signal to an address decoding circuit 28. The address decoding circuit 28 demodulates address data pertaining to the optical disk 10 from the address signal and feeds the thus-demodulated address data to the servo processor 30 and the system controller 32. The RF circuit 26 also feeds a reproduced RF signal to a binarization circuit 34. The binarization circuit 34 binarizes the reproduced signal and feeds the thus-acquired signal to an encoding/decoding circuit 36. The encoding/decoding circuit 36 subjects the binarized signal to demodulation and error correction, to thus acquire reproduced data. The reproduced data are output to the host 100, such as a personal computer, by way of an interface I/F 40. When the reproduced data are output to the host 100, the encoding/decoding circuit 36 outputs the reproduced data after temporarily storing the data in buffer memory 38.

A data block designated by the read command are stored in the buffer memory 38, and a previously-read data block is also stored as cache data in the buffer memory 38. As a result, when a sequential read command is next issued and performed, a data block does not need to be read from the optical disk 10, and the essential requirement is to read the data block from the buffer memory 38. Hence, a read speed is increased. A caching method using the buffer memory 38 is as follows:

(1) Pre-reading operation is performed even after execution of a read command, thereby leaving data cached in the buffer memory 38.

(2) The data block transferred to the host 100 by means of a read command is discarded from the buffer memory 38.

(3) When the read command is issued and when a data block designated by the read command is not present in the buffer memory 38, cache data are cleared, and execution of the read command is commenced.

A write command is issued by the host 100, such as a personal computer, into which the optical disk drive is incorporated. When data are recorded in the optical disk 10 in response to the write command, data to be recorded transmitted from the host 100 are fed to the encoding/decoding circuit 36 by way of the interface I/F 40. The encoding/decoding circuit 36 stores in the buffer memory 38 the data to be recorded; encodes the data to be recorded; and feeds the thus-encoded data as modulated data to a write strategy circuit 42. In accordance with a predetermined recording strategy, the write strategy circuit 42 converts the modulated data into a multipulse (a pulse train), and feeds the multipulse as record data to the driver 22. Since the recording strategy affects recording quality, the strategy is fixed to a certain optimum strategy. The laser beam whose power is modulated by record data is emitted from the LD of the optical pickup 16, whereupon data are recorded in the optical disk 10. After recording of data, the optical pickup 16 radiates a laser beam of reproducing power, thereby reproducing the record data; and feeds the record data to the RF circuit 26. The RF circuit 26 feeds a reproduced signal to the binarization circuit 34, and the thus-binarized data are fed to the encoding/decoding circuit 36. The encoding/decoding circuit 36 decodes the modulated data, and verifies the thus-decoded data against record data stored in the buffer memory 38. A result of verification is fed to the system controller 32. The system controller 32 determines whether to continually record data in accordance with the result of verification or to perform alternating operation.

In such a configuration, optimum rotational speed of a disk; namely, an optimum reproduction rate, can be defined as the minimum speed required to keep the buffer memory 38 full at all times. Ideally, an average transfer rate for the host 100 becomes equal to a transfer rate at which data are read from the optical disk 10. The optimum reproduction rate can be evaluated by means of whether or not a time interval at which the buffer memory 38 becomes full (i.e., a time interval from when the buffer memory 38 becomes full at certain timing until when next the buffer memory becomes full) is appropriate. Specifically, on the assumption that a time interval at which the buffer memory 38 becomes full is ti; that a predetermined lower limit value is t1; and that a predetermined upper limit value is t2, a situation close to the above conditions is achieved, so long as a relationship of $t1 \leq ti \leq t2$ stands. The predetermined lower limit value t1 is; for example, one second, and the predetermined upper limit value t2 is 1.5 seconds. When a relationship of $ti<t1$ stands, the relationship shows that a time interval at which the buffer memory becomes full is short; namely, that the rotational speed is too high and that a data read rate is much greater than an average transfer rate for the host. In contrast, when a relationship of $ti>t2$ stands, the time interval at which the buffer memory becomes full is determined to be long. Namely, it shows that the rotational speed is too low. As a matter of course, if the rotational speed is too low and much slower than the data transfer rate, the time interval will become infinite (i.e., the buffer memory will never become full). Accordingly, when the relationship of $ti<t1$ stands, the rotational speed is decreased. When the relationship of $ti>t2$ stands, the rotational speed is increased. Thus, the rotational speed is controlled so as to attain the relationship of $t1 \leq ti \leq t2$, thereby realizing an appropriate time interval. Thus, the rotational speed of the disk can be controlled to an optimum value conforming to the average transfer rate for the host 100.

Figure 2:
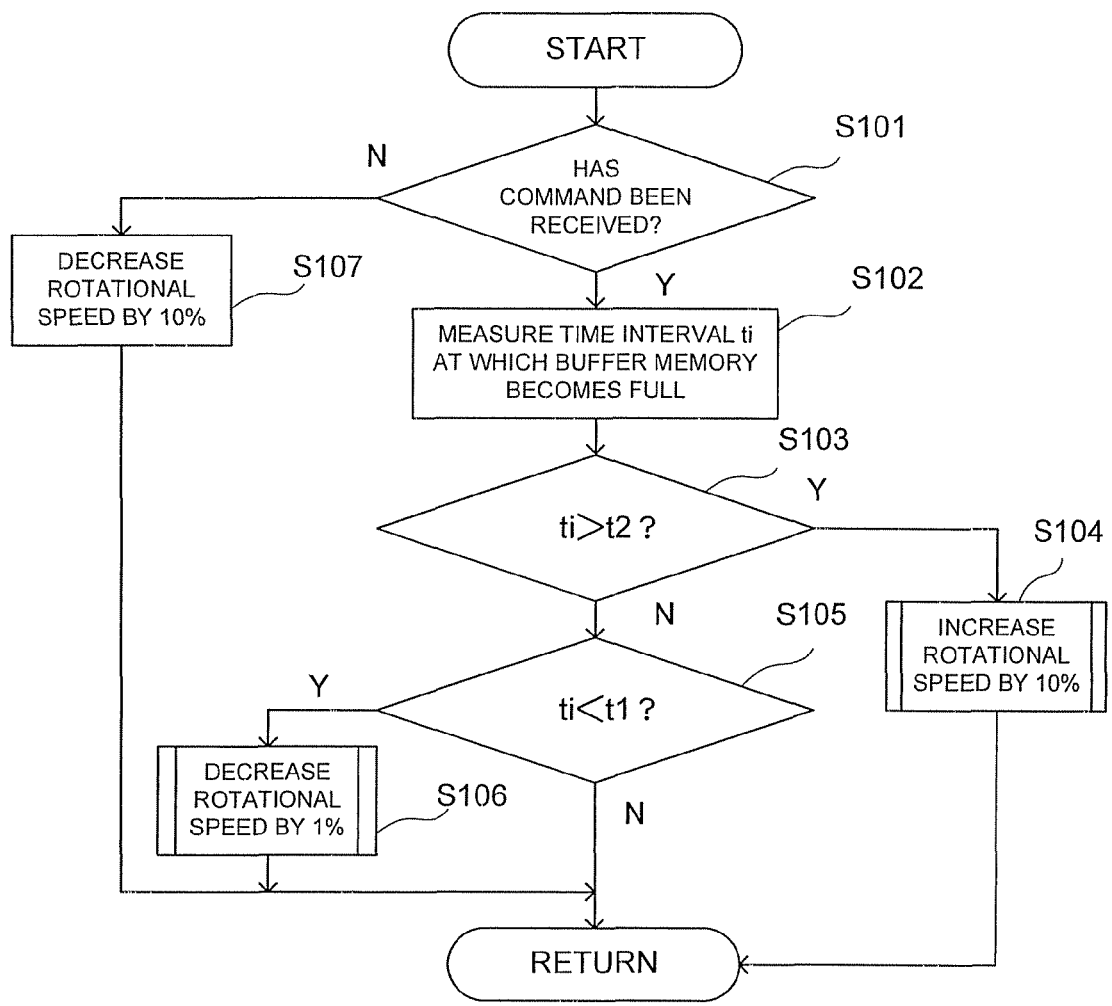
FIG. 2 is a flowchart of processing performed in the embodiment.

FIG. 2 shows a flowchart of processing performed in the embodiment. First, the system controller 32 determines whether or not a command is received from the host 100 within a predetermined period of time (S101). In a state where a read command, and the like, is received from the host 100, the following processing is performed in order to implement a rotational speed conforming to the transfer rate of the host 100. Specifically, the time interval ti at which the buffer memory 38 becomes full is measured (S102). The system controller 32 performs read—ahead control until the buffer memory 38 becomes full, and stops read—ahead control at timing when the buffer memory has become full (data are read from the optical disk 10, but decoding of the data is stopped or decoded data are discarded without being stored in the buffer memory 38). Hence, a timer is started when the buffer memory has become full, and the timer is stopped at timing when next the buffer memory becomes full, whereby the time interval ti at which the buffer memory becomes full can be measured. The time interval ti may also be a result of one measurement operation or an average of results of a plurality of measurement operations.

After measurement of the time interval ti, ti is first compared with the upper limit value t2, thereby determining whether or not a relationship of ti>T2 stands (S103). The reason for first comparing ti with t2 is that a determination must be made early because a distinguished anomaly, such as a sound skip and an image skip, arises when the rotational speed is slow. Another reason is that increasing the rotational speed involves consumption of much longer time than decreasing the rotational speed. When the relationship of ti>t2 stands, the current rotational speed is determined to be slow, and the rotational speed is controlled so as to increase from the current value by 10%. Specifically, the system controller 32 controls the driver 14 by way of a servo processor 30, thereby controlling the rotational speed of the spindle motor 12 so as to increase by 10%.

In the meantime, when the relationship of ti>t2 does not stand, ti is next compared with t1, thereby determining whether or not the relationship of ti<t1 stands (S105). In the case of ti<t1, the current rotational speed is determined to be fast, and the rotational speed is controlled so as to decrease from the current value by 1%. Specifically, the system controller 32 controls the driver 14 byway of the servo processor 30, thereby controlling the rotational speed of the spindle motor 12 so as to decrease by 1% (S106). In the case of an increase in rotational speed, the rotational speed is increased by 10%. In the case of a decrease in rotational speed, the rotational speed is decreased by 1%. The reason for such asymmetric control is that, when the rotational speed is slow as mentioned above, the rotational speed must be immediately increased so as not to induce a sound skip or an image skip. Increasing/decreasing control of the rotational speed will be further described in detail later.

When neither the relationship of ti>t2 nor the relationship of ti<t1 stands; namely, when the relationship of t1≦ti≦t2 stands, the system controller 32 determines the current rotational speed is appropriate to the average transfer rate for the host 100 and maintains the current rotational speed intactly.

When NO is selected in S101; namely, when a command is not received from the host 100 within a given period of time; for example, when there is a period during which a command is not received from the host 100 because reading of data from a disk and selective operation performed by way of the user's keyboard or mouse are alternately conducted at the time of installation of application software; controlling a rotational speed performed at the time interval ti is not appropriate. Hence, the system controller 32 decreases the current rotational speed by 10% regardless of ti, thereby attempting to diminish power consumption (S107).

Figure 3:
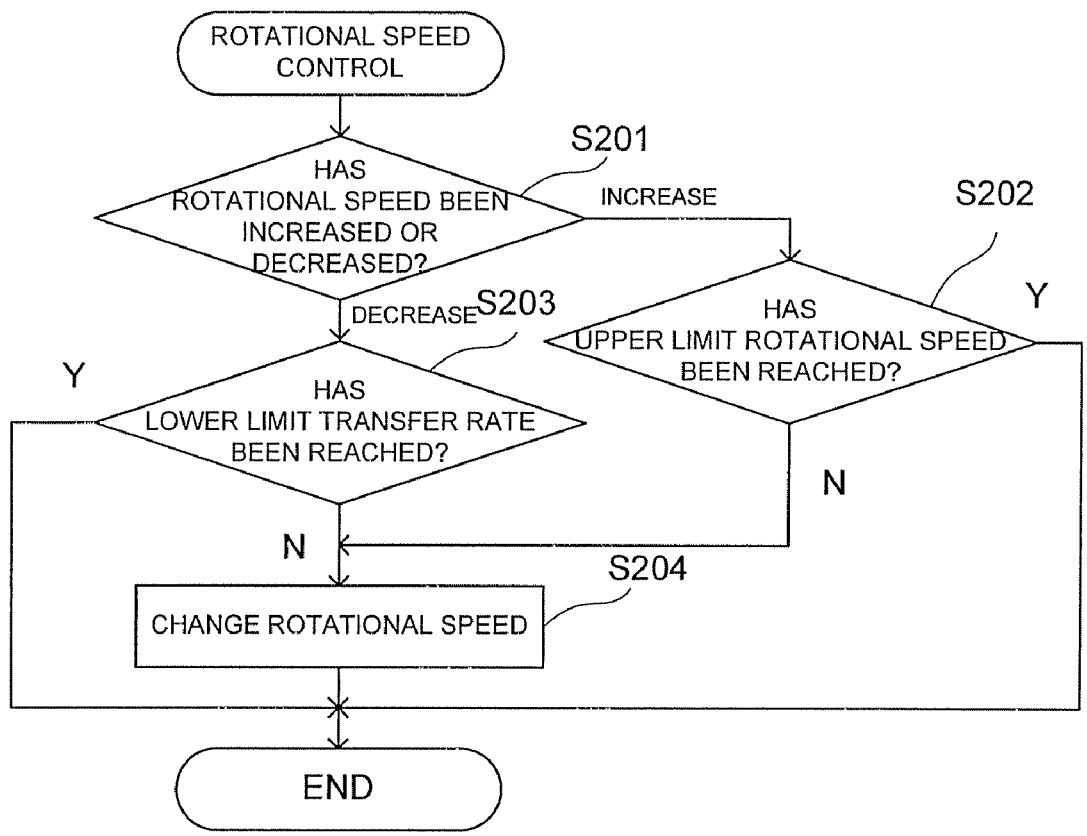
FIG. 3 is a detailed flowchart pertaining to control of rotational speed performed in the embodiment.

FIG. 3 is a detailed flowchart pertaining to increasing/decreasing control of a rotational speed performed at the time interval ti; namely, processing pertaining to S104 and S106 shown in FIG. 2. When YES is determined in S103 or when YES is determined in S105, processing proceeds to this subroutine after a flag has been set.

First, a determination is made as to whether the rotational speed is increased or decreased (S201). The determination is made according to the type of a flag set when YES is selected as a determination in S103 and S105. When the rotational speed is increased; namely, when YES is selected in S103 because of the relationship of ti>t2, a determination is then made as to whether or not the current rotational speed has already reached a predetermined upper limit rotational speed determined by a servo system (S202). When the upper limit speed is not yet reached, a change in rotational speed is allowed, and the rotational speed is increased by 10% as mentioned in connection with S104 (S204). In the meantime, when the rotational speed is decreased; namely, when YES is selected as a determination in S105 because of the relationship of ti<t1, a determination is then made as to whether or not the current rotational speed has reached a lower limit transfer rate (S203). When the lower limit transfer rate is not reached, a change in rotational speed is allowed, and the rotational speed is decreased by 1% as mentioned in connection with S106 (S204). When the rotational speed is decreased by 10% in S107, the rotational speed can be decreased irrespective of the lower limit transfer rate. The rotational speed may also be decreased to predetermined lower limit rotational speed determined by the servo system.

In the present embodiment, in the case of an increase in rotational speed, the rotational speed is increased at increments of 10%. In the case of a decrease in rotational speed, the rotational speed is decreased at decrements of 1%. However, these numerals are merely illustrative, and another control is also possible. For instance, in the case of an increase in rotational speed, the rotational speed is increased at increments of 200 rpm. In the case of a decrease in rotational speed, the rotational speed is decreased at decrements of 100 rpm, and the like. In either case, it is desirable that the rate of an increase in rotational speed be larger than the rate of a decrease in rotational speed. In the case of an increase in rotational speed, the rotational speed may also be increased at increments of 200 rpm when the current rotational speed is equal to or lower than a certain threshold value. When the current rotational speed has exceeded a certain threshold value, the rotational speed may also be increased at increments of 100 rpm.

In the embodiment, the lower limit value t1 is set to one second, and the upper limit value t2 is set to 1.5 seconds. However, these values may also be set to other values or set in accordance with the capacity of the buffer memory 38. In the present embodiment, the time interval ti at which the buffer memory 38 becomes full is used as an index for determining whether or not the rotational speed of the disk is appropriate. This is especially effective for a case where the capacity of the buffer memory 38 is comparatively small and where a deviation from an appropriate value of rotational speed is responsively reflected on the status of the buffer memory 38.

What is claimed is:

1. A disk drive comprising:
   a reading section for reading data from a disk;
   memory for temporarily retaining data read from the disk; and
   a control section that controls rotational speed of the disk in accordance with a time interval, the time interval corresponding to a time at which the memory becomes full, the control section controlling the rotational speed of the disk so as to keep the time interval between a set lower limit value and a set upper limit value by first comparing the time interval against the set upper limit value, then either increasing the rotational speed when the time interval is greater than the set upper limit value and when a current rotational speed of the disk is less than an upper rotational speed limit or comparing the time interval against the set lower limit value when the time interval is equal to or smaller than the set upper limit value, and when the time interval is smaller than the set upper time limit value and smaller than the set lower limit value and when a current transfer rate is greater than a lower transfer rate limit, decreasing the rotational speed.

2. The disk drive according to claim 1, wherein the control section controls an increasing rate employed when the rotational speed is increased so as to become greater than a decreasing rate employed when the rotational speed is decreased.

3. The disk drive according to claim 1, wherein the control section performs control so as to decrease the rotational speed regardless of the time interval when a command is not received from a host within a given period of time.

4. The disk drive according to claim 1, wherein the memory is buffer memory.

5. The disk drive according to claim 1, wherein the control section reads data ahead from the disk until the memory becomes full; controls the reading section so as to stop ahead-reading of data at timing when the memory becomes full; starts a timer at timing when the memory becomes full; and stops the timer at timing when next the memory becomes full, thereby measuring a timing interval at which the memory becomes full.

6. The disk drive according to claim 1, wherein the control section decreases the rotational speed when a current rotational speed is greater than a lower limit rotational speed determined in accordance with a servo system and when the time interval is smaller than the set lower limit value.

7. The disk drive according to claim 1, wherein the control section increases the rotational speed when a current rotational speed is smaller than an upper limit rotational speed determined in accordance with a servo system and when the time interval is larger than the set upper limit value.

8. An information processing system comprising:
the disk drive defined in claim 1; and
a host that transmits a command, including at least a read command, to the disk drive and that receives data read from the disk in accordance with the read command.

9. A method comprising:
determining a time interval associated with an amount of time it takes a memory in an optical disk drive system to become full; and
changing a rotational speed of a disk in the disk drive system based on the time interval by first increasing the rotational speed of the disk if the time interval is greater than a set upper time limit value and when a current rotational speed of the disk is less than an upper rotational speed limit, and decreasing the rotational speed of the disk if the time interval is smaller than the set upper time limit value and smaller than a set lower time limit value and when a current transfer rate is greater than a lower transfer rate limit.

10. The method of claim 9, further comprising:
determining if the disk drive system has received a command;
increasing the rotational speed of the disk when the disk drive system has received the command; and
decreasing the rotational speed of the disk when the disk drive system has not received the command.

11. The method of claim 9, further comprising:
increasing the rotational speed of the disk by a first set increment when a current rotational speed of the disk is less than or equal to a rotational speed limit, and increasing the rotational speed of the disk by a second set increment when the current rotational speed of the disk is greater than the rotational speed limit.

12. The method of claim 9, the rotational speed of the disk is increased by 10% and decreased by 1%.

13. A method comprising:
determining a time interval associated with an amount of time it takes a memory in an optical disk drive system to become full; and
changing a rotational speed of a disk in the disk drive system based on the time interval by first increasing the rotational speed of the disk if the time interval is greater than a set upper time limit value and decreasing the rotational speed of the disk if the time interval is smaller than the set upper time limit value and smaller than a set lower time limit value, wherein changing the rotational speed of the disk includes increasing the rotational speed of the disk by a first set increment when a current rotational speed of the disk is less than or equal to a rotational speed limit, and increasing the rotational speed of the disk by a second set increment when the current rotational speed of the disk is greater than the rotational speed limit.

14. The method of claim 13, further comprising:
determining if the disk drive system has received a command;
increasing the rotational speed of the disk when the disk drive system has received the command; and
decreasing the rotational speed of the disk when the disk drive system has not received the command.

15. A disk drive comprising:
a reading section for reading data from a disk;
memory for temporarily retaining data read from the disk; and
a control section that controls rotational speed of the disk in accordance with a time interval, the time interval corresponding to a time at which the memory becomes full, the control section controlling the rotational speed of the disk so as to keep the time interval between a set lower limit value and a set upper limit value by first comparing the time interval against the set upper limit value, then either increasing the rotational speed when the time interval is greater than the set upper limit value or comparing the time interval against the set lower limit value when the time interval is equal to or smaller than the set upper limit value, and when the time interval is smaller than the set lower limit value decreasing the rotational speed, the control section further controls the rotational speed of the disk by increasing the rotational speed of the disk by a first set increment when a current rotational speed of the disk is less than or equal to a rotational speed limit, and increasing the rotational speed of the disk by a second set increment when the current rotational speed of the disk is greater than the rotational speed limit.

16. The disk drive according to claim 15, wherein the control section controls an increasing rate employed when the rotational speed is increased so as to become greater than a decreasing rate employed when the rotational speed is decreased.

17. The disk drive according to claim 15, wherein the control section performs control so as to decrease the rotational speed regardless of the time interval when a command is not received from a host within a given period of time.

18. The disk drive according to claim 15, wherein the control section reads data ahead from the disk until the memory becomes full; controls the reading section so as to stop ahead-reading of data at timing when the memory becomes full; starts a timer at timing when the memory becomes full; and stops the timer at timing when next the memory becomes full, thereby measuring a timing interval at which the memory becomes full.

19. The disk drive according to claim 15, wherein the control section decreases the rotational speed when a current rotational speed is greater than a lower limit rotational speed determined in accordance with a servo system and when the time interval is smaller than the set lower limit value.

20. The disk drive according to claim 15, wherein the control section increases the rotational speed when a current rotational speed is smaller than an upper limit rotational speed determined in accordance with a servo system and when the time interval is larger than the set upper limit value.

* * * * *